United States Patent
Hirai et al.

(10) Patent No.: US 11,587,230 B2
(45) Date of Patent: Feb. 21, 2023

(54) CELL SHEET EVALUATION METHOD

(71) Applicant: Hitachi, Ltd., Tokyo (JP)

(72) Inventors: Kakuro Hirai, Tokyo (JP); Masaharu Kiyama, Tokyo (JP); Erino Matsumoto, Tokyo (JP)

(73) Assignee: Hitachi, Ltd, Tokyo (JP)

( * ) Notice: Subject to any disclaimer, the term of this patent is extended or adjusted under 35 U.S.C. 154(b) by 270 days.

(21) Appl. No.: 17/087,259

(22) Filed: Nov. 2, 2020

(65) Prior Publication Data

US 2021/0142473 A1 May 13, 2021

(30) Foreign Application Priority Data

Nov. 12, 2019 (JP) .............................. JP2019-205007

(51) Int. Cl.
*G06T 7/00* (2017.01)

(52) U.S. Cl.
CPC .. *G06T 7/0012* (2013.01); *G06T 2207/20048* (2013.01); *G06T 2207/30024* (2013.01)

(58) Field of Classification Search
CPC ......... G06T 7/0012; G06T 2207/20048; G06T 2207/30024; G06T 7/42; G06T 2207/20056
See application file for complete search history.

(56) References Cited

U.S. PATENT DOCUMENTS

| | | | | |
|---|---|---|---|---|
| 5,933,519 A | * | 8/1999 | Lee ........................ | G06V 20/69 382/133 |
| 2016/0202172 A1 | * | 7/2016 | Guck ........................ | G06T 7/11 435/288.7 |

FOREIGN PATENT DOCUMENTS

| | | |
|---|---|---|
| JP | 2009-027928 A | 2/2009 |
| JP | 2012-152189 A | 8/2012 |

OTHER PUBLICATIONS

Tsankov et a.: "Transcription Factor Binding Dynamics during Human ES Cell Differentiation",: Feb. 19, 2015; McMillan Publishers Limited; pp. 344-349 (Year: 2015).*
Wegener, J., et al., "Automated multi-well device to measure transepithelial electrical resistances under physiological conditions", BioTechniques, Oct. 2004, pp. 590-597, vol. 37, No. 4.
Potma, E. et al., "Detection of single lipid bilayers with coherent anti—Stokes Raman scattering (CARS) microscopy", Journal of Raman Spectroscopy, Mar. 2003, pp. 642-650, vol. 34, No. 9.

* cited by examiner

*Primary Examiner* — Siamak Harandi
(74) *Attorney, Agent, or Firm* — Procopio, Cory, Hargreaves & Savitch LLP

(57) ABSTRACT

Provided is a novel cell sheet evaluation method. A cell sheet evaluation method includes: a step of analyzing, based on an observed image of a cell sheet, a characteristic indicating shape uniformity of cells constituting the cell sheet; and a step of evaluating a binding state between cells in the cell sheet based on the analysis result.

4 Claims, 4 Drawing Sheets

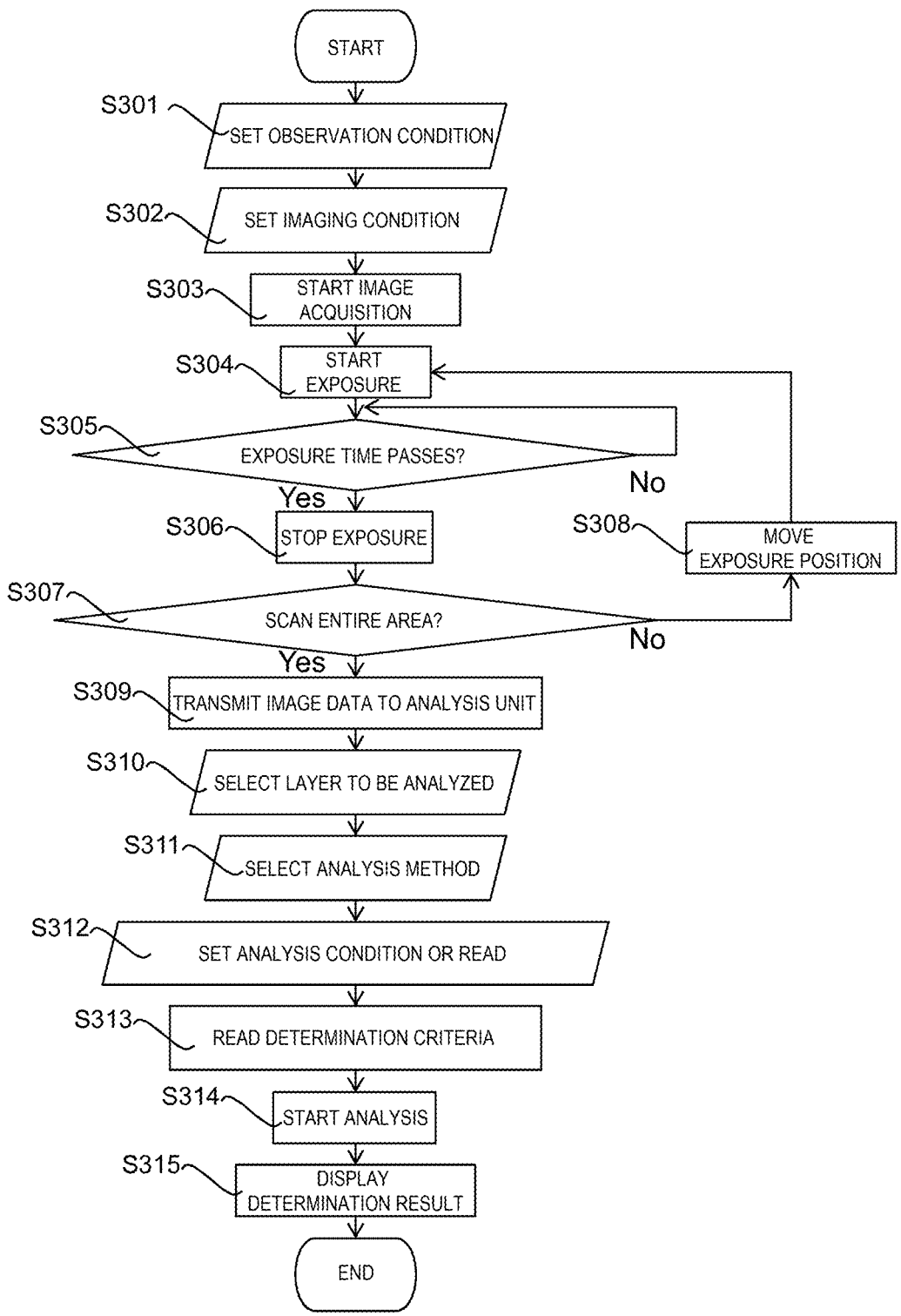

CELL SHEET EVALUATION METHOD

BACKGROUND OF THE INVENTION

1. Field of the Invention

The present invention relates to a cell sheet evaluation method.

2. Description of the Related Art

Regenerative medicine is a treatment method in which cells that have been differentiated from stem cells or the like are transplanted to repair damaged or functionally deteriorated tissue and recover to normal tissue. One of typical transplantation forms is a cell sheet in which cell-cell and cell-extracellular matrix are bound. The cell sheets are intended for treatment of a wide range of positions such as skin, cornea, heart, cartilage, esophagus, and a research towards practical application has accelerated and some have been commercialized.

Quality of cultured cells is generally evaluated by a histological analysis for fixing the cells, and it has been difficult to evaluate the cells themselves for transplantation. In an epithelial cell sheet used for treatment of cornea and skin, a quality evaluation method utilizing a transepithelial electrical resistance that can be measured in a cultured state by using formation of tight junctions has been proposed (see J. Wegener et al., "Automated multi-well device to measure transepithelial electrical resistances under physiological conditions", BioTechniques, vol. 37, No. 4 (2004), p. 590, JP-A-2009-27928), and measuring devices have been commercialized by several companies. Further, as a quality evaluation method applicable not only to the epithelium but also to a cell sheet, a method of determining a sheeting state by measuring intensity of light transmitted through the cell sheet has also been proposed (see JP-A-2012-152189).

SUMMARY OF THE INVENTION

An object of the invention is to provide a novel cell sheet evaluation method.

An embodiment of the invention is a cell sheet evaluation method including: a step of analyzing, based on an observed image of a cell sheet, a characteristic indicating shape uniformity of cells constituting the cell sheet; and a step of evaluating a binding state between cells in the cell sheet based on the analysis result. The characteristic may be a spatial frequency, and the spatial frequency may be analyzed by using a Fourier transform. Further, the characteristic is particle diameter distribution or shape distribution of the cells constituting the cell sheet. The step of evaluating the binding state between the cells includes a first step of analyzing the characteristics of a standard sample of the cell sheet that is shown to be appropriate, a second step of comparing the characteristics of the standard sample with the characteristics of the cell sheet, and a third step of evaluating a binding state between cells in the cell sheet based on a compared result in the second step.

According to the invention, the novel cell sheet evaluation method can be provided.

BRIEF DESCRIPTION OF THE DRAWINGS

FIG. 3 is a flow chart according to the embodiment of the invention.

DESCRIPTION OF THE PREFERRED EMBODIMENTS

The embodiments and specific examples of the invention described below are preferred embodiments of the invention, are presented for purposes of illustration or description, and are not intended to limit the invention thereto. It will be apparent to those skilled in the art that various changes and modifications can be made based on the description herein within the spirit and scope of the invention disclosed herein.

==Configuration of Cell Sheet Evaluation System==

Figure 1:
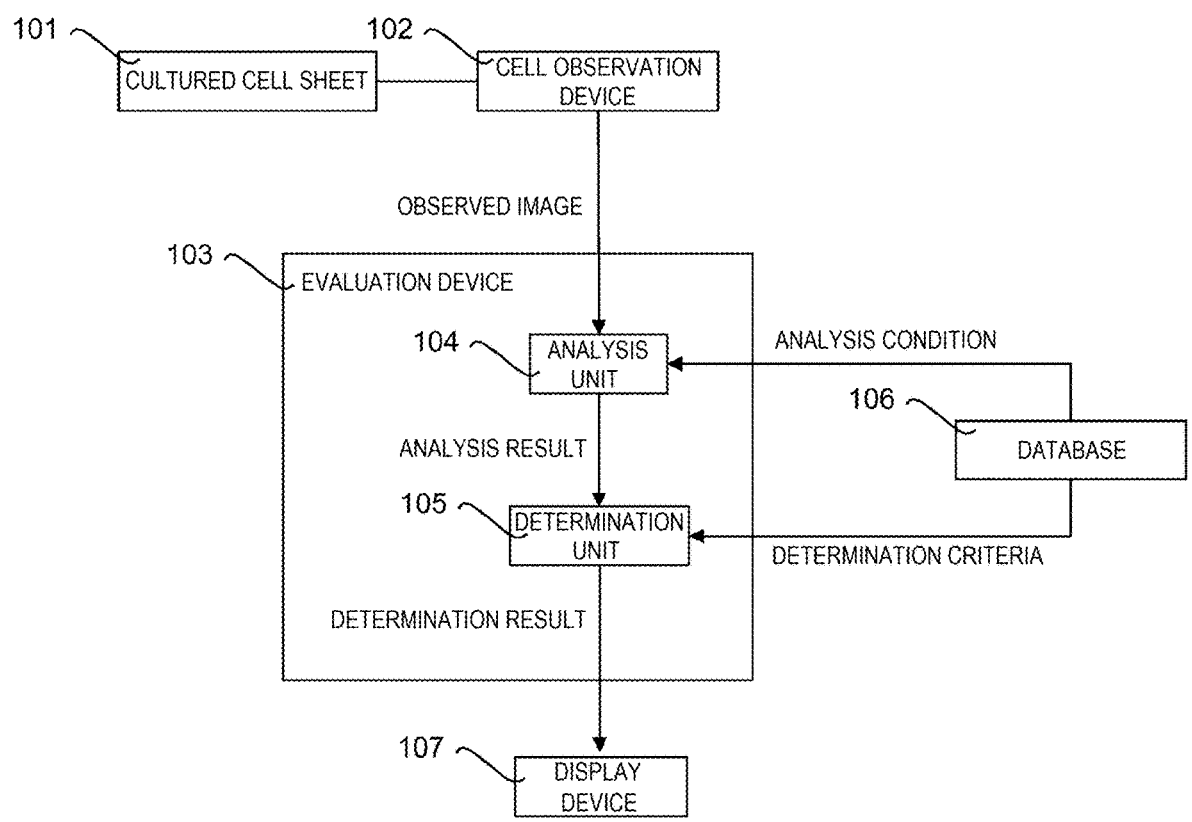
FIG. 1 is an overall diagram of an evaluation system according to an embodiment of the invention.
Figure 2:
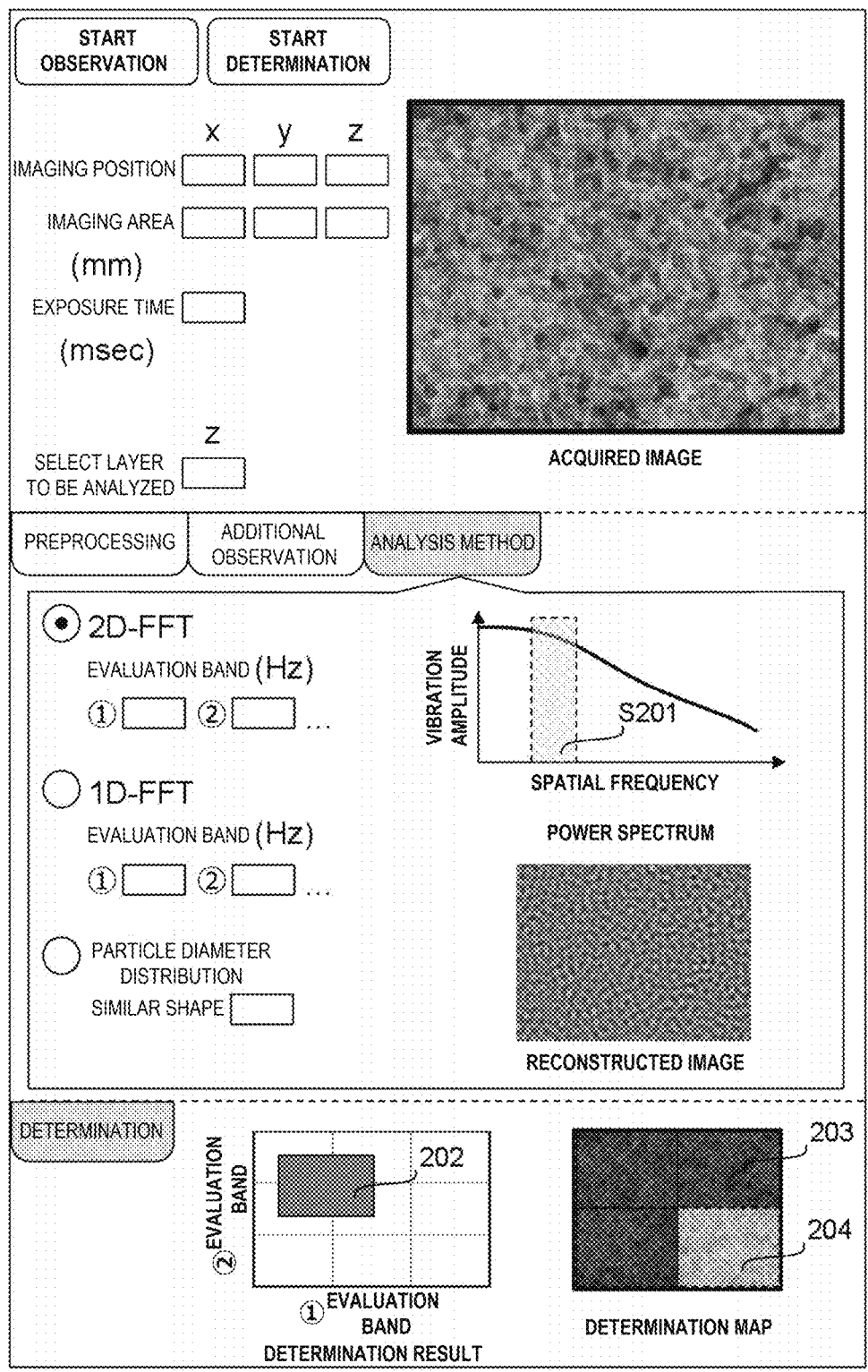
FIG. 2 is an example of a user interface of the evaluation system according to the embodiment of the invention.

FIG. 1 is a schematic diagram showing an example of the cell sheet evaluation system disclosed in the present specification. This evaluation system includes a cell observation device 102 for observing a cultured cell sheet 101 and creating image data, an evaluation device 103 for analyzing an observed image, a display device 107 including a user interface, and a database 106. The database 106 may be in the evaluation device 103 or in a storage device separated from the evaluation device 103. FIG. 2 shows an example of the user interface. Setting of observation conditions and analysis conditions and a determination result are displayed. For example, an evaluation band 201 can be changed in a power spectrum graph on the interface, and an observed image used for data can be determined with reference to a reconstructed image in a selected frequency band. As a selection criterion, information necessary for evaluation such as information on sizes of cell sheet constituent cells can be used.

The cultured cell sheet 101 may be a single layer or may be laminated to have a multilayer structure. A type of cells is not particularly limited, but cells having a relatively uniform shape such as epithelial cells and parenchymal cells are preferable.

The cell observation device 102 includes an observation device for observing the cultured cell sheet 101, an imaging device for taking an image of the cultured cell sheet 101 observed by the observation device and generating image data, a transmission unit for transmitting the image data to the evaluation device, and an observation condition input unit with which a user inputs observation conditions and imaging conditions. When the cultured cell sheet 101 has a multilayer structure, the observation device 102 preferably has a three-dimensional observation capability so that any layer of the cultured cell sheet having the multilayer structure can be observed, and a confocal microscope or a digital holographic microscope is an example thereof. When the cultured cell sheet 101 is a monolayer cell sheet, an observation device such as a phase-contrast microscope, a bright field microscope, or a differential interference microscope, which does not have the three-dimensional observation capability, may be used. The imaging device is preferably a ccd camera including an image element.

The evaluation device 103 includes an analysis unit 104 that analyzes the observed image of the cultured cell sheet 101 included in the image data, a determination unit 105 for determining an analysis result, a receiving unit for receiving an image file from the cell observation device 102, an output unit for outputting a determination result of the observed image to the display device, and an analysis condition input unit with which the user inputs analysis conditions and the like.

The database 106 includes analysis conditions used in the past for analyzing the observed images, determination criteria of the cultured cell sheet 101, and the like.

==Outline of Cell Sheet Evaluation Method Using Cell Sheet Evaluation System==

FIG. 3 is a flow chart showing a process from setting of the observation conditions to output of a determination result of a cultured state. Firstly, the user inputs an observation condition (for example, an observation area) (S301) and an imaging condition (for example, an exposure time) (S302) from the observation condition input unit. According to the observation condition and the imaging condition, image acquisition is started by using the observation device (S303), exposure is performed using the imaging device, and an entire area is scanned while moving an exposure position (S304 to S308), such that image data of the entire area is obtained. The image data is transmitted to the analysis unit (S309). The user selects a layer of the cell sheet to be analyzed from the analysis condition input unit while referring to the observed image displayed on the display unit (S310), and further sets an analysis method (S311) and an analysis condition (S312). The analysis method and the analysis condition may be set by user inputting, but for culture conditions with a track record of analysis, existing settings may be read from the database. Next, the user reads the determination criteria of a cultured state from the database (S313). Analysis is started when all the settings are completed (S314). After the analysis is completed, the determination result is displayed (S315).

Regarding the determination result, a single result may be displayed for the observed image used for evaluation, or the determination result may be displayed as a frequency domain 202 corresponding to an appropriate cell sheet state in a determination result diagram as shown in FIG. 2. In this case, if the analysis result is included in the frequency domain 202, the evaluated cell sheet is determined to be an appropriate cell sheet. Alternatively, the image may be divided, and unreasonable determination 203 or reasonable determination 204 may be displayed for each domain.

==Cell Sheet Analysis Method Part 1 Analysis Step==

As described above, the analysis method for analyzing the cell sheet used in the cell sheet evaluation method includes a step of analyzing characteristics indicating shape uniformity of cells constituting the cell sheet based on the observed image of the cell sheet, and evaluating a binding state between cells in the cell sheet based on the analysis result.

The characteristic indicating the shape uniformity of the cells is preferably a spatial frequency, but a method of analyzing the spatial frequency is not particularly limited. For example, two-dimensional Fourier transform focusing on periodicity of the constituent cells may be used. Alternatively, a one-dimensional Fourier transform that evaluates only periodicity in a single direction may be used, and when the cells constituting the cell sheet are nearly circular and there is no direction dependence in the periodicity, it can be expected that results same as that obtained by the two-dimensional Fourier transform can be obtained at low computational cost. A frequency band used for the analysis may be appropriately selected according to a cell type, a culturing method, an observation method and the like. Further, a particle diameter of each single cell constituting the cell sheet and shape distribution may be analyzed to evaluate the uniformity of the cell sheet. For example, it is conceivable to approximate a cell shape with any figure to derive particle diameter distribution, and determine that the cell sheet is appropriate when a ratio of a mode value is a certain value or more.

==Cell Sheet Analysis Method Part 2 Preprocessing of Analysis==

In the cell sheet analysis method disclosed herein, since the uniformity of the cells constituting the cell sheet is used, it is considered that it is useful to clarify cell boundaries in order to improve accuracy of the analysis. Therefore, edge detection using various differential filters, a combination of binarization and morphology processing, and the like may be performed as preprocessing for performing the above-described analysis.

Alternatively, wavelength-specific interaction between the cells and light can be detected by spectroscopic measurement such as Raman spectroscopy, absorption spectroscopy, or autofluorescence observation, and distribution information of a specific substance can be obtained. For example, it has been reported that a lipid membrane of a biological substance can be visualized by Raman spectroscopy. It is considered that by superimposing this distribution information on the observed image, boundaries of the cells constituting the cell sheet become clearer. Here, as a substance to be visualized, a substance specifically existing in a cell membrane or a tight junction can be exemplified.

It is expected that by preprocessing the observed image and clarifying the cell boundaries, the uniformity of cells constituting the cell sheet can be evaluated with high resolution. In particular, it is considered to be effective when a clear observed image cannot be obtained in an intermediate layer due to lamination.

==Evaluation Method of Cell Sheet==

A step of evaluating a binding state between cells in a sample of a cell sheet to be evaluated includes a first step of analyzing characteristics of one or more standard cell sheet samples that is shown to be appropriate, a second step of comparing the characteristics of the obtained standard sample with characteristics of the sample to be evaluated, and a third step of evaluating the binding state between the cells in the sample to be evaluated based on a compared result.

In the first step, the characteristics of one or more standard samples are analyzed in away same as the characteristics of the sample to be evaluated. At the same time, it is preferable to analyze characteristics of one or more non-standard samples of cell sheets that are shown to be inappropriate. It is more preferable that the characteristics of a plurality of the standard samples and the characteristics of a plurality of the non-standard samples are analyzed. Whether or not the cell sheet is appropriate may be determined by appearance, may be determined by a physical measurement value such as the transepithelial electrical resistance value (TER value), and may be determined by a success or failure result obtained by actually performing an act such as transplanting that is a purpose.

In the second step, the characteristics of the obtained standard sample and the characteristics of the sample to be evaluated are compared. When the characteristics of the non-standard samples are obtained, it is preferable to compare the characteristics of the samples to be evaluated with the characteristics of the non-standard samples. When there are a plurality of standard samples and non-standard samples, the characteristics may be obtained in a range of same values.

In the third step, when the characteristics of the sample to be evaluated includes the characteristics of the standard sample, the sample is evaluated as an appropriate cell sheet, and when the characteristics of the sample to be evaluated does not include the characteristics of the standard sample, the sample is evaluated as an inappropriate cell sheet. When the characteristics of the non-standard samples are obtained, it is preferable to consider the characteristics as well. For example, when the characteristics of the sample to be evaluated includes the characteristics of the standard sample and does not include the characteristics of the non-standard sample, the sample is evaluated as the appropriate cell sheet, and when the characteristics of the sample to be evaluated does not include the characteristics of the standard sample and includes the characteristics of the non-standard samples, the sample is evaluated as the inappropriate cell sheet. When the characteristics of the sample to be evaluated includes both the characteristics of the standard sample and the characteristics of the non-standard sample, or when the characteristics of the sample to be evaluated does not includes neither the characteristics of the standard sample nor the characteristics of the non-standard sample, the evaluation may be not performed. For example, when the characteristics of the standard samples and non-standard samples are obtained in the range of same values, "includes the characteristic" means falling within the range, and "does not include the characteristic" means not falling within the range. Here, the range may be a range in which only one limit is determined, such as "more than or equal to", "less than or equal to", "more than", and "less than". Alternatively, a boundary between the standard sample and the non-standard sample may be determined as a threshold value.

Example

The present example shows that the method disclosed herein provides results that correlate with transepithelial electrical resistance measurements.

In the present example, a monolayer cell sheet of retinal pigment epithelium was used. Five cell sheets of retinal pigment epithelium were cultured, and the observed images were obtained at five points on each sheet by using the phase-contrast microscope provided with the ccd camera, so as to perform evaluation.

Figure 4A:
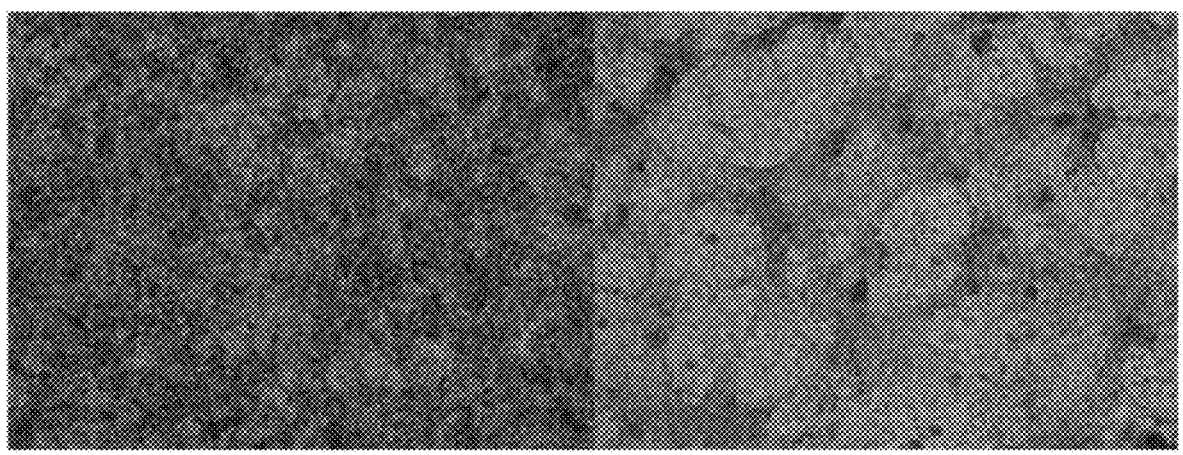
FIG. 4A is a diagram showing a phase-contrast microscope image of a cell sheet in an example of the invention.
Figure 4B:
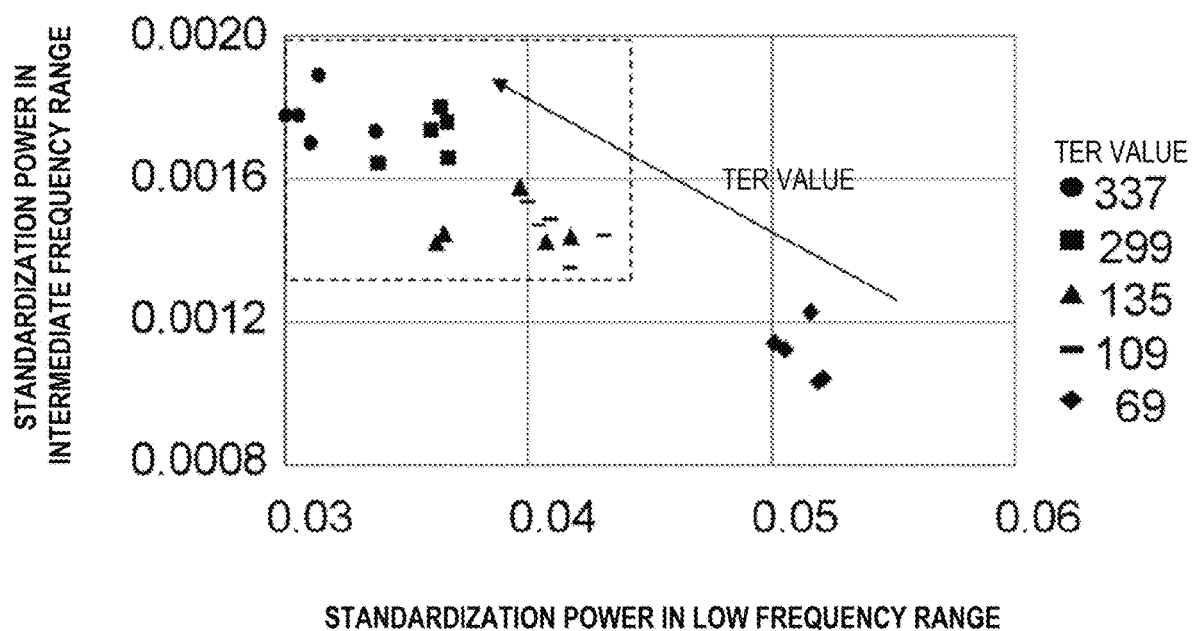
FIG. 4B is a diagram showing a correlation between spatial frequency analysis performed by a two-dimensional Fourier transform and a transepithelial electrical resistance value (TER value) in the example of the invention.

In order to evaluate the observed images, periodicity of the constituting cells was focused, and spatial frequency analysis was used by two-dimensional Fourier transform. Two frequency bands used for the analysis were selected, that is, a low frequency band and an intermediate frequency band. As the low frequency band, a frequency band (1-10 Hz) including cell size information at a culture initial stage, in which the retinal pigment epithelium did not form intercellular bonds, was selected. As the intermediate frequency band, a frequency band (100-120 Hz) including cell size information at a culture latter stage, which can be visually recognized when cells are boned and have a regular shape, was selected. A phase-contrast microscope picture of a cell sheet having a transepithelial electric resistance value (TER value) of 337 and a cell sheet having a transepithelial electric resistance value of 69 is shown in FIG. 4A. As is apparent from the appearance, the cell sheet having the TER value of 337 has a uniform and preferable sheet shape. Then, for each observed image, a graph in which a power of each frequency band derived from a power spectrum is two-dimensionally plotted is shown in FIG. 4B. A same plot marker shows an analysis result at different positions on the same cell sheet. This graph shows that as the TER value increases, a power in the low frequency range decreases and a power in the intermediate frequency range increases.

Thus, the method disclosed herein provides results that correlate with the transepithelial electrical resistance measurements. Here, in the retinal pigment epithelium cell sheet, since the TER value that makes an appropriate culture state is 100 or more, it is determined that the retinal pigment epithelium cell sheet in an upper left square of FIG. 4B is in the appropriate culture state.

In order to determine suitability of a retinal pigment epithelium cell sheet in an actual culture, an observed image of the cell sheet is obtained to perform the spatial frequency analysis in the low frequency band and the intermediate frequency band by two-dimensional Fourier transform, and the retinal pigment epithelium cell sheet in the upper left square in FIG. 4B may be determined as an appropriate cell sheet.

What is claimed is:

1. A cell sheet evaluation method comprising:
a step of analyzing, based on an observed image of a cell sheet, a characteristic indicating shape uniformity of cells constituting the cell sheet; and
a step of evaluating a binding state between cells in the cell sheet based on an analysis result;
wherein the step of evaluating the binding state between cells includes:
a first step of analyzing the characteristics of a standard sample of the cell sheet;
a second step of comparing the characteristics of the standard sample with the characteristics of the cell sheet; and
a third step of evaluating a binding state between cells in the cell sheet based on a compared result in the second step.

2. The cell sheet evaluation method according to claim 1, wherein the characteristic is a spatial frequency.

3. The cell sheet evaluation method according to claim 2, wherein the spatial frequency is analyzed by using a Fourier transform.

4. The cell sheet evaluation method according to claim 1, wherein the characteristic is a particle diameter distribution or a shape distribution of the cells constituting the cell sheet.

* * * * *